July 29, 1952 N. S. CRUMB 2,604,718
ARTIFICIAL BAIT
Filed Aug. 13, 1947
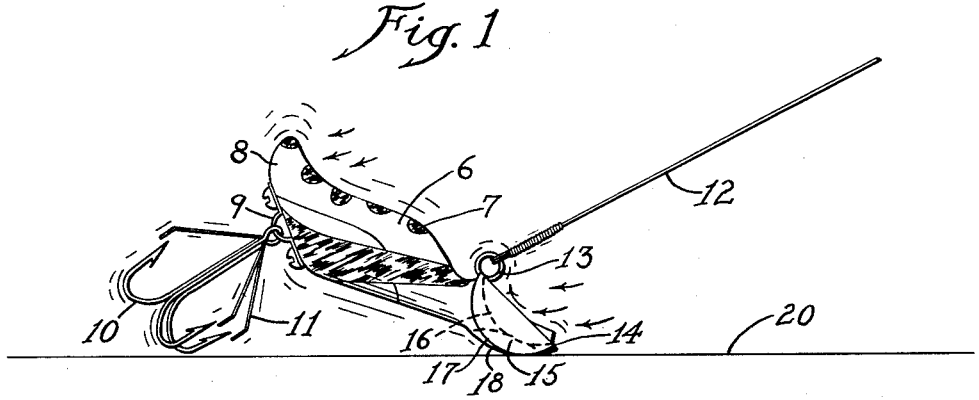
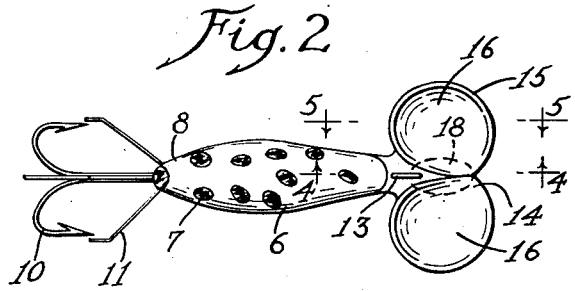
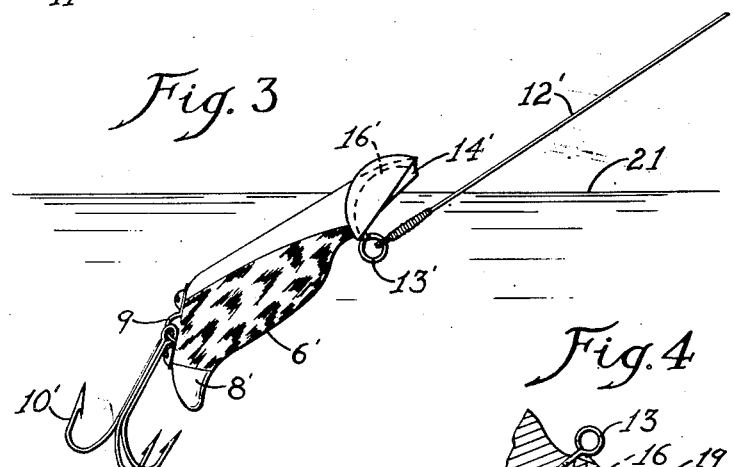
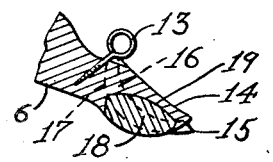
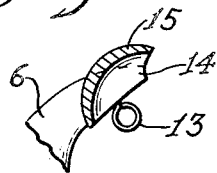
Inventor:
Neal S. Crumb
Andrew F. Wintercorn
Atty.

UNITED STATES PATENT OFFICE 2,604,718

ARTIFICIAL BAIT

Neal S. Crumb, Rockford, Ill.

Application August 13, 1947, Serial No. 768,445

4 Claims. (Cl. 43—42.47)

This invention relates to a new and improved artificial bait or fish lure.

The principal object of my invention is to provide an artificial bait, the elongated body of which may be shaped and colored to resemble a bug or beetle, minnow, frog, or other object, one end of the body having a cross-portion that is dished on one side to the right and left of the center-line of the body, and the line or leader being attached to the body intermediate its ends but close to the cross-portion, so that the dished ends of the cross-portion will give the body the desired lifelike movements when the line is pulled with sudden jerks, so as to attract the attention of nearby fish, a plural-pronged hook being attached to the other end portion of the body on the opposite side from the line-attaching eye.

Another object is to provide a bait of the kind described above, which has the body weighted on the under side on that end on which the cross-portion is provided, whereby to adapt the bait to deep water fishing, the bait when unweighted being suitable for surface or near to the surface fishing.

The invention is illustrated in the accompanying drawing, in which—

Fig. 1 is a side view of an artificial bait made in accordance with my invention, indicating how the same is used in the weighted form for deep water fishing;

Fig. 2 is a top plan view of the bait shown in Fig. 1;

Fig. 3 is a side view of a bait like that of Fig. 1 but unweighted, and illustrated in operation for surface or near to the surface fishing, and Figs. 4 and 5 are sectional details on the correspondingly numbered lines of Fig. 2.

Similar reference numerals are applied to corresponding parts throughout the views.

Referring to Figs. 1, 2, 4, and 5, the elongated body 6 may be formed to simulate the body of a beetle or bug and is suitably colored, as indicated at 7, to help to attract the attention of nearby fish. To the underside of the rear portion 8 is attached an eye 9, onto which the three-pronged fish hook 10 is pivotally attached, the hook barbs being protected by weed guards 11, so as to make this bait suitable for deep water fishing. The line or leader 12 is attached to an eye 13 provided on the top of the body near the reduced front end 14. A cross-portion 15 is provided on the front end 14, which is suitably integral with the reduced front end 14, and is dished on the front face, as indicated at 16, on both sides of the longitudinal center-line of the body and rounded on the back face, as indicated at 17. A weight 18 is applied to the under side of the front end of the body in a recess 19, so that the bait will be unbalanced sufficiently to insure having the dished portions 16 catch the water as the bait is pulled forwardly along the bottom 20, thereby insuring the bait running at an angle of anywhere from 45° to 60° relative to the bottom 20. This is important for deep water fishing, because in that kind of fishing the bait must tend to head downwardly. The dished portions 16 cause sufficient agitation of the water, besides causing the body 6 to sway from side to side and oscillate in a fore and aft plane with respect to the line 12 as it is pulled forward, to insure attracting the attention of nearby fish, the scheme being to give the impression of a beetle or bug in distress, and thus tempt the fish to bite, when, of course, they will be caught on the hooks 10. I have found this deep running bait, with its bumping along the bottom, to be very good for wall-eye pike fishing, when the fish are running deep.

In the other form, illustrated in Fig. 3, the body 6' has the plural-pronged hook 10' pivotally connected to the rear end 8' on the eye 9', this bait being adapted to run in the water at or near the surface 21, with the cupped portions 16' acting to catch and throw the water in sprays on opposite sides of the line or leader 12', there being no weight 18 in the front end portion 14'. With this surface bait, I rely upon the weight of the hook 10' to keep the tail end 8' down, and, because of the absence of the weight 18, this bait will rise to the surface when the line 12' is pulled. I have found that it has a very nice action when retrieved in short jerks; it sinks slowly between jerks, and gives the desirable "pop" as it comes to the surface when the line is jerked, thus attracting the attention of bass in shallow water and weed beds.

Both baits can be made in bait casting size and also in fly rod size, so that for a given beetle or bug design there are four different baits available, bearing in mind the two sizes and the presence or absence of the weight 18. The same applies for a minnow design, a frog design, a spoon design, and so forth, which with the various color combinations possible make the number of possible baits involving the present features almost unlimited.

It is believed the foregoing description conveys a good understanding of the objects and advantages of my invention. The appended claims have been drawn to cover all legitimate modifications and adaptations.

I claim:

1. An artificial lure comprising a body of greater length than width provided with a head end defining two cup portions in transverse alignment, the centers of the cup portions lying in a plane at right angles to the longitudinal axis of the remaining portion of the body, said body having its rear end formed with a flat surface at an acute angle to the longitudinal axis, means projecting from said surface for supporting a hook thereon, the cup portions having their upper edges in substantially the same plane, said plane being at an acute angle to the plane of said flat surface, a fishing line securing eye located between the cup portions and secured to the body adjacent the edges of the cup portions, and a weight embedded in said cup portions exposed at the under surface thereof.

2. An artificial lure comprising a body of greater length than width provided with a head end defining two cup portions in transverse alignment, the centers of the cup portions lying in a plane at right angles to the longitudinal axis of the remaining portion of the body, said body having its rear end extending in a plane at an acute angle to the longitudinal axis, means projecting from an intermediate portion of said angular rear end portion for supporting a hook thereon on the opposite side of the body from the hollows of the cup portions, the cup portions having their edges in substantially the same plane, said plane being at an acute angle to the longitudinal axis, a fishing line securing eye located between the cup portions and secured to the body adjacent the edges of the cup portions, and a weight embedded in said cup portions exposed at the back surface thereof.

3. An artificial lure comprising a body of greater length than width provided with a head end defining two cup portions in transverse alignment, the centers of the cup portions lying in a plane at right angles to the longitudinal axis of the remaining portion of the body, said body having its rear end formed with a flat surface at an acute angle to the longitudinal axis, means projecting from said surface for supporting a hook thereon, the cup portions having their upper edges in substantially the same plane, said plane being at an acute angle to the plane of said flat surface, and a fishing line securing eye located between the cup portions and secured to the body adjacent the edges of the cup portions.

4. An artificial lure comprising a body of greater length than width provided with a head end defining two cup portions in transverse alignment, the centers of the cup portions lying in a plane at right angles to the longitudinal axis of the remaining portion of the body, said body having its rear end extending in a plane at an acute angle to the longitudinal axis, means projecting from an intermediate portion of said angular rear end portion for supporting a hook thereon on the opposite side of the body from the hollows of the cup portions, the cup portions having their edges in substantially the same plane, said plane being at an acute angle to the longitudinal axis, and a fishing line securing eye located between the cup portions and secured to the body adjacent the edges of the cup portions.

NEAL S. CRUMB.

REFERENCES CITED

The following references are of record in the file of this patent:

UNITED STATES PATENTS

| Number | Name | Date |
|---|---|---|
| 1,490,161 | Dickman | Apr. 15, 1924 |
| 1,636,832 | Pagin | July 26, 1927 |
| 1,833,522 | Goble | Nov. 25, 1931 |
| 2,207,425 | Arbogast | July 9, 1940 |
| 2,360,563 | Harman | Oct. 17, 1944 |